Aug. 18, 1959   R. B. CURL ET AL   2,900,068
RESILIENT ROLLER POTATO DIGGER ATTACHMENT
Filed Oct. 18, 1957   3 Sheets-Sheet 1

Robert B. Curl
Homer H. Butler, Jr.
INVENTORS

Robert B. Curl
Homer H. Butler, Jr.
INVENTORS

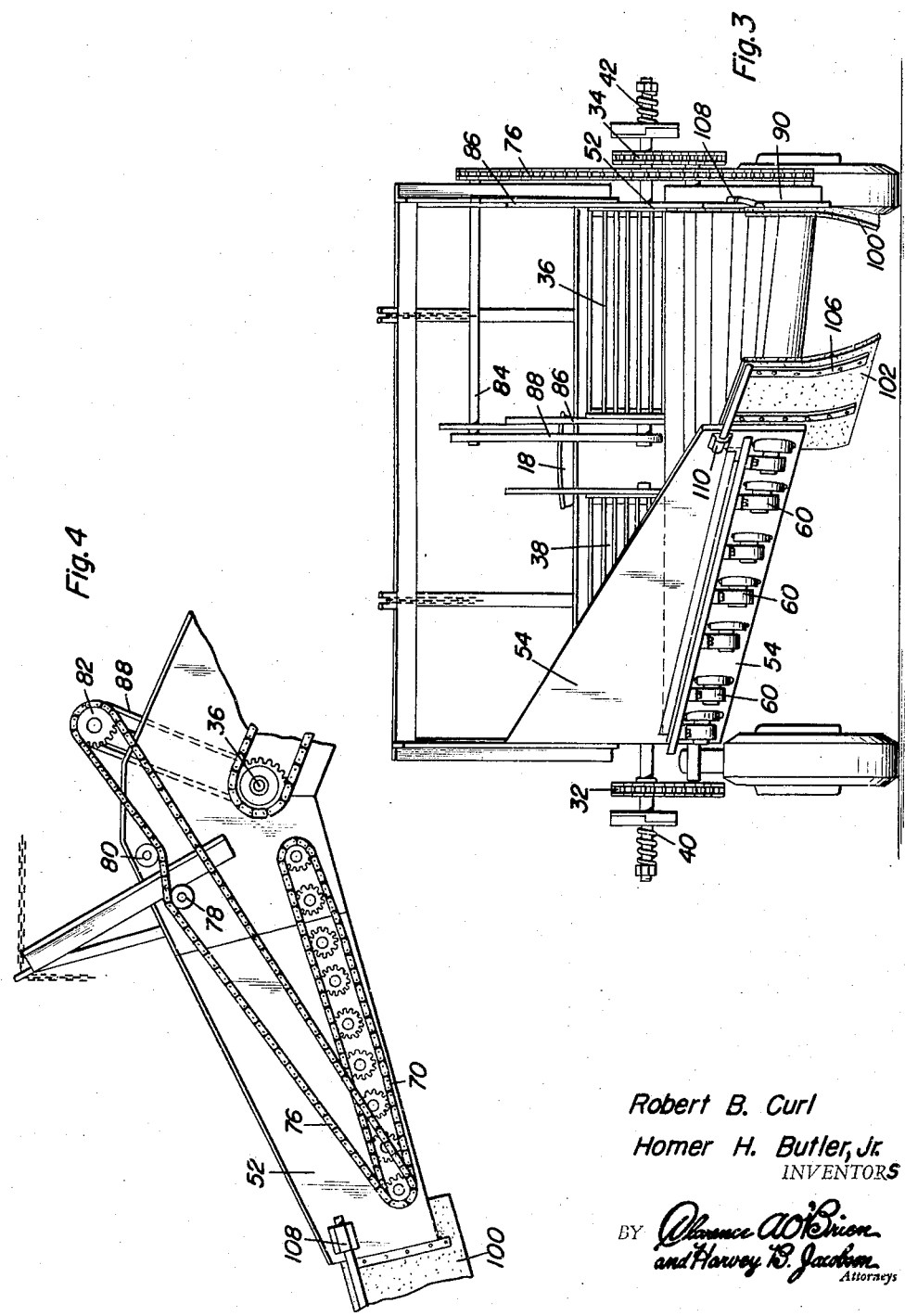

2,900,068
RESILIENT ROLLER POTATO DIGGER ATTACHMENT

Robert B. Curl, Twin Falls, and Homer H. Butler, Jr., Kimberly, Idaho

Application October 18, 1957, Serial No. 690,978

2 Claims. (Cl. 198—65)

This invention relates to an attachment for a potato digger.

An object of the invention is to provide an attachment which will fit or which can be easily connected to any potato digger to take the place of regular rear extensions of the potato diggers. Corrugated rubber rollers are used in place of the usual digger chains, thereby reducing bruising to a minimum. The rollers tend to clean the potatoes and eliminate clods and vines, thereby placing unusually clean potatoes in the row.

A further object of the invention is to provide an attachment for a two-row potato digger which combines the yield of the two rows and places them in a single row. This is achieved by having one side of the attachment formed straight and the other side formed at an angle of approximately 45 degrees. The straight side has its discharge end lower than the angulated side so that the potatoes moving over the rollers of the extension have a tendency to roll toward the lower side, at which they are discharged. This simplifies the task of combining two rows of potatoes into a single row and results in a tremendous advantage for mechanical loading equipment, as well as for hand pickers.

One of the most important achievements of the invention is that the attachment practically eliminates bruising, thereby resulting in a large saving to the potato grower. Bruised potatoes that are placed in storage have a tendency to cause good potatoes to spoil prematurely. With this source of difficulty eliminated by my invention, the yield of a potato crop is increased due to the better handling and more efficient storage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a rear view of the attachment and a part of the potato digger as would be viewed along the line 3—3 of Figure 2.

Figure 4 is a fragmentary elevational view showing a suggested means of drive for the rollers of my attachment.

Figure 5 is an enlarged sectional view taken on the line 5—5 of Figure 1.

Figure 1:
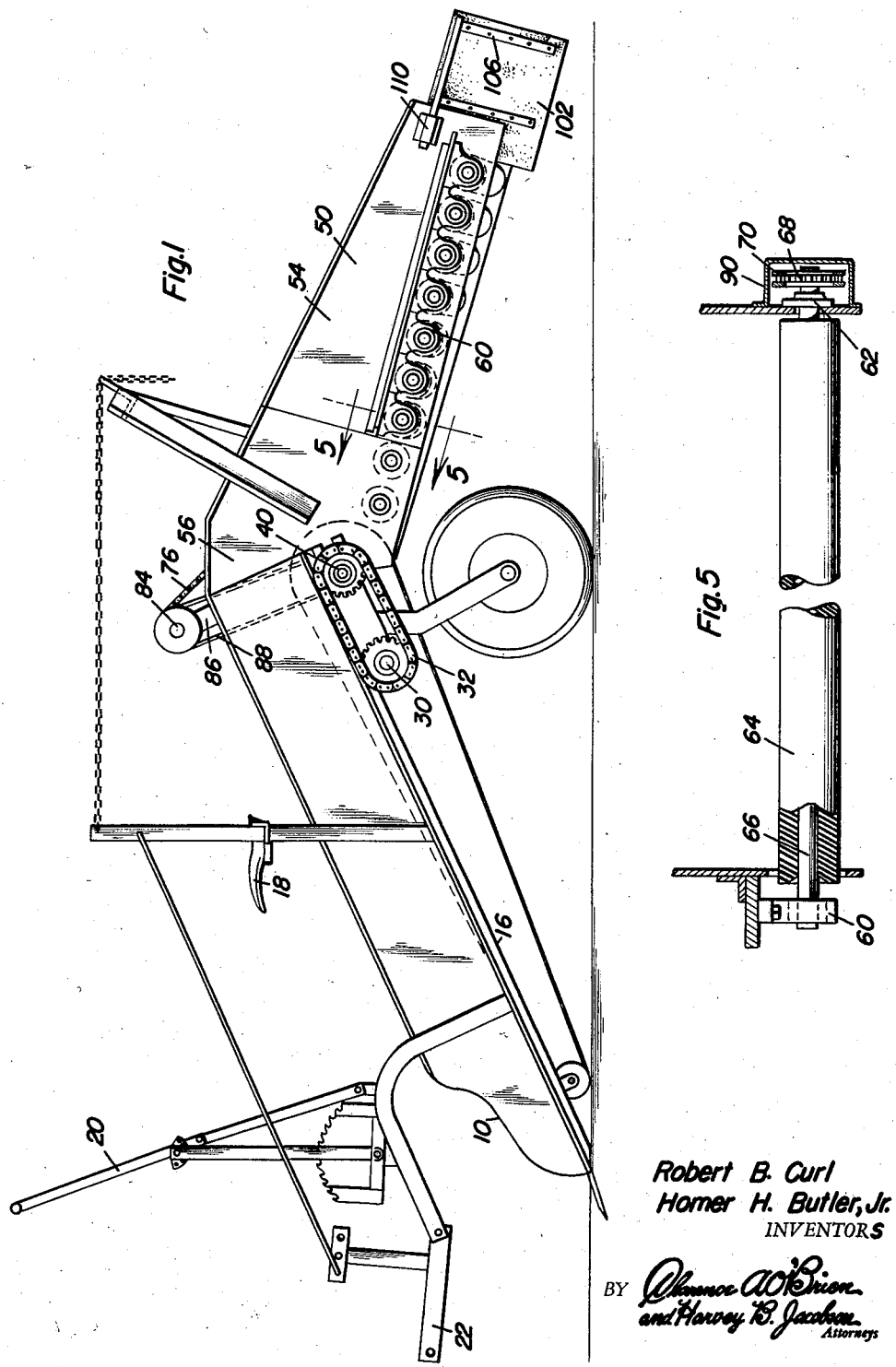
Figure 1 is an elevational side view of a purely conventional, two-row potato digger that is fitted with an attachment constructed in accordance with the invention.

In the accompanying drawings, there is a two-row potato digger 10. This digger has two endless conveyors 12 and 14 respectively carried by a frame 16 and located behind the potato digging plows. The illustrated two-row digger is the type on which the operator rides while in seat 18 at about the center of the digger and between the rows. He has hand levers 20 by which to control the potato digger as it is pulled by tongue 22 which attaches to a tractor drawbar.

Figure 2:
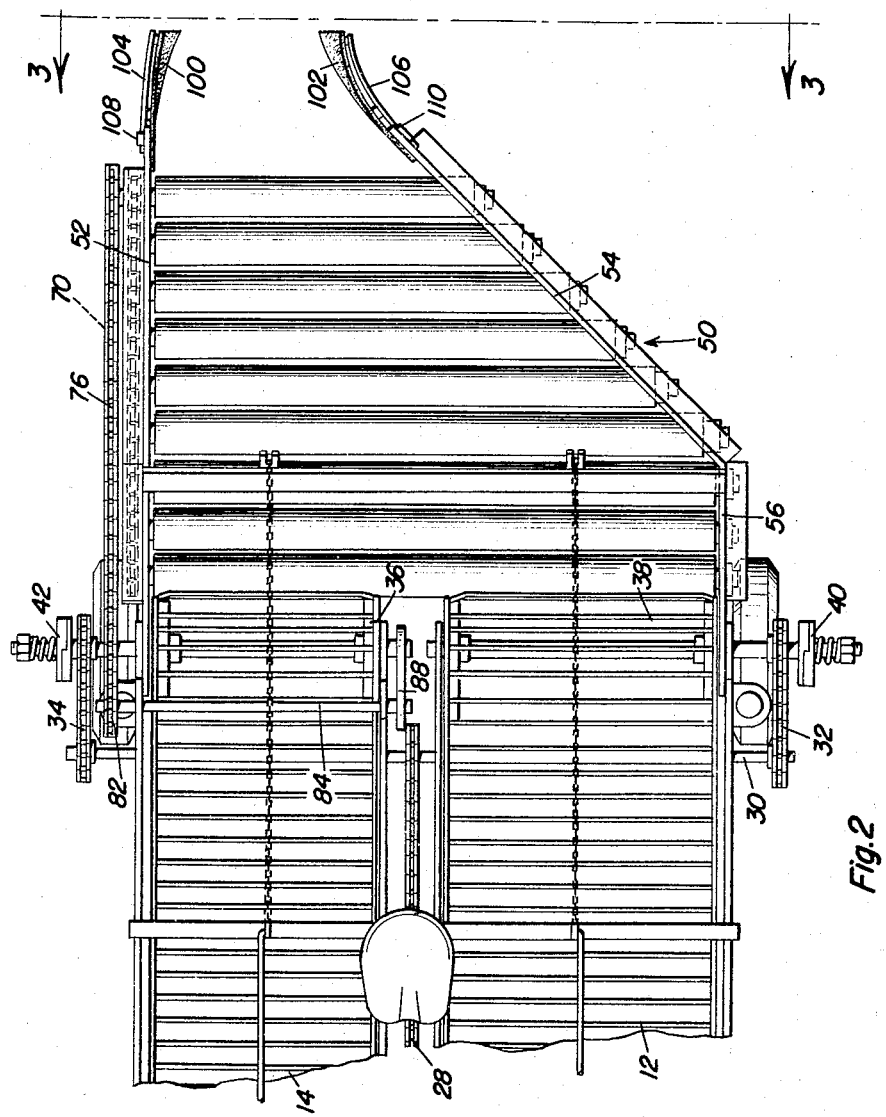
Figure 2 is a top view of my attachment and a small part of the conventional potato digger.

The potato digger conveyors are driven by chain 28 (Figure 2) which is entrained around a sprocket on transverse shaft 30. Chains 32 and 34 drive the upper spool assemblies 36 and 38 of the endless conveyor through slip clutches 40 and 42.

My attachment 50 is connected to the discharge end of the two-row potato digger by being secured to frame 16. The attachment has a straight side 52 and an angulated side 54 arranged at approximately 45 degrees to the side 52. The sides 52 and 54 are wider at the potato entrance end thereof that is registered with the discharge ends of the endless conveyors 12 and 14 and in this region side 54 has a straight portion 56 that is parallel to the corresponding portion of side 52. It is in these regions that connection is made between the attachment 50 and the two-row digger.

Side 54 has a plurality of spaced bearings 60 carried by it. The construction may be such that the bearings hang from a flange of side 54. A corresponding number of bearings are in the opposite side of the attachment and each pair of bearings including a bearing 60 and a corresponding bearing 62 (Figure 5) supports a corrugated resilient roller 64. The roller may be made of rubber or plastic and consists of a spindle 66 on which a rubber or plastic cover is attached. A sprocket 68 is secured to the end of spindle 66 opposite that end that is mounted for rotation in bearing 60. As shown in Figure 4 each of the spindles of the rollers 64 are constructed in this way, and a single train 70 is engaged with the upper parts of each of the sprockets. An end sprocket is doubled to accommodate chain 76 from which power to drive the rollers is derived. This chain extends over idler sprocket 78 and 80 that are mounted on spindles carried by one of the sides of the attachment, and it is also entrained around a sprocket 82 that is fixed to shaft 84. This shaft is mounted in supports 86 (Figure 1) rising from the potato digger and has a chain or belt 88 drivingly connecting with its end. This belt is entrained over a pulley on shaft 84 or if a chain is used is entrained over a sprocket. The opposite end of the belt is entrained around a pulley on the shaft of spool assembly 36. In this way power for the rollers 64 of my attachment 50 is obtained from the motive power of the potato digger. At the same time my attachment derives the advantage of the two slip clutches.

In order to exclude dirt from the bearings I may use the sealed type and a cover 90 over the sprockets 68 and chain 70.

As shown in Figure 3 one side 52 of the attachment is depressed with respect to the opposite side 54 so that the rollers slope toward the side 52, the rearward rollers 64 sloping downwardly at greater angles successively to the discharge end of the attachment. The potatoes, then, have a tendency to slide against or at least toward side 52 at the end of which they are discharged in a single neat row without bruising.

Rubber guides or baffles 100 and 102 respectively are attached to frames 104 and 106. These frames are separably connected by clamps 108 and 110 to the ends of sides 54 and 52. The lower parts of the guides or baffles are directed inwardly slightly so that the potatoes are guided in their travel as they discharge from the attachment. Since the guides are made of rubber or some soft material, the potatoes are very unlikely to be bruised as they are issued from the machine attachment.

The foregoing is consideerd as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a two-row potato digger having parallel sides, an attachment to collect the potatoes that are discharged from the two-row potato digger and issue them in a single row, said attachment having a rear discharge end comprising a pair of sides that are spaced from each other in the rear of the potato digger, a plurality of rollers extending across said sides of the attachment, each roller having a resilient surface to prevent bruising the potatoes, said rollers sloping downwardly toward one side of the attachment and at greater angles successively towards said discharge end to tend to slide the potatoes toward said one side, means responsive to the forward movement of the two-row potato digger for rotating said rollers, resilient upright guides of soft material attached to said sides of the attachment at the discharge end of said attachment in order to direct the potatoes in a row.

2. The attachment of claim 1 wherein one of said sides of said attachment forms a substantial coplanar extension and continuation of one of the sides of said digger, and the other of said sides of the attachment having a portion which forms a substantial continuation and extension of the other side of the two-row potato digger and which is inclined toward the first mentioned side of said attachment to cooperate with the angularity and inclination of said rollers tending to slide the potatoes toward one side of the attachment as they are being discharged; and upright frames on said sides of the attachment backing said guides.

References Cited in the file of this patent

UNITED STATES PATENTS

| | | |
|---|---|---|
| 1,313,011 | Pinger | Aug. 12, 1919 |
| 1,931,454 | Anderson | Oct. 17, 1933 |
| 2,136,516 | Martin | Nov. 15, 1938 |
| 2,559,965 | Innes | July 10, 1951 |
| 2,651,398 | McGraw | Sept. 8, 1953 |